Sept. 2, 1969          L. L. FOWLER          3,464,557
MOVABLE FILTER AND MAGNETIC SEALING MEANS
Filed Dec. 12, 1966                     4 Sheets-Sheet 2

INVENTOR.
LESLIE L. FOWLER
BY
JEFFERS & YOUNG
ATTORNEYS

United States Patent Office 3,464,557
Patented Sept. 2, 1969

3,464,557
MOVABLE FILTER AND MAGNETIC SEALING MEANS
Leslie L. Fowler, Cookeville, Tenn., assignor to Bowser, Inc., Cookeville, Tenn., a corporation of Indiana
Filed Dec. 12, 1966, Ser. No. 601,011
Int. Cl. B01d 33/02
U.S. Cl. 210—97                    15 Claims

ABSTRACT OF THE DISCLOSURE

An endless filter belt is mounted for movement over a vacuum chamber in a tank. Magnetic means are associated with the edges of the belt and the chamber to reduce leakage between the belt and the chamber.

---

My invention relates to a liquid filter and particularly to a liquid filter having a movable filtering media which is used with a vacuum chamber.

Filters are very important in industry, particularly in the manufacturing industry and the chemical industry. In the manufacturing industry, for example, cutting oils are used with machine tools as a lubricant or as a coolant. Such oils can be re-used without damage to the oil or machine if the dirt and impurities are filtered out. As another example, grinding solutions or liquids are used with grinders as a coolant and as a carrier for the grinding particles. Such liquids can also be re-used if the dirt and impurities are filtered out. In still another example, special liquid solutions are used to cool the rollers in rolling mills. Impurities in such solutions may stain or damage the surface of the metal being rolled, or may impair the quality of the metal being rolled. Therefore, such solutions should be clean before being used. In the chemical industry, for example, water for cooling and processing may be re-used if it is filtered for the job at hand. Water or other liquids used for waste treatment may also be re-used or disposed if filtered. And the water from sludges may be re-used or disposed if it is filtered.

Accordingly, an object of my invention is to provide an improved liquid filter for removing dirt, impurities and other foreign matter from oils and liquids used in grinding, cutting, and forming operations.

Another object of my invention is to provide an improved filter which has a filtering media that can be used in a number of different applications and for a number of different purposes.

Another object of my invention is to provide an improved liquid filter for removing dirt, impurities, and other foreign matter from water and liquids used in cooling and treating, or from water and liquids derived from sludge or waste matter.

In the manufacturing industry, the chemical industry, and sanitation industry, mass production or a high rate of production is important in keeping costs down. Where such production requires oils, water, or liquids, a considerable saving can be made if the oils, water, or liquids can be re-used or disposed. If the oils, water, or liquids are re-used, it is desirable that they be filtered at a high rate so that production is not delayed for lack of filtered oil, water, or liquid.

Accordingly, another object of my invention is to provide an improved filter which may have a high rate of liquid filtering.

In liquid filtering, a main factor in providing a high rate of filtering is that the filter media be quickly cleaned or replaced. Many applications for filters do not permit the shutting down and removal of the filter from service so that the filter media can be replaced. In addition, it is not easy to tell when the filter media of present filters need replacing. Sometimes, the only indication of an excessively dirty filter media is reduced filtering, a condition which may be critical or intolerable when reached.

Accordingly, an object of my invention is to provide a filter having a filtering media that is easily and quickly cleaned without removal of the filter from service.

Another object of my invention is to provide a filter which renews or replaces the filter media when it has filtered a predetermined amount of dirt and impurities.

Another object of my invention is to provide a movable filter media which can be fully and efficiently utilized.

Another object of my invention is to provide a filter which has a movable filter media that filters liquids drawn through the filter media by suction, and that can be quickly moved to present a measured new or clean filter media in response to the suction vacuum exceeding a predetermined magnitude.

Briefly, these and other objects are achieved in accordance with my invention by a receiving tank for the oil, water, or other liquid to be filtered. A vacuum chamber is positioned in the tank and preferably arranged so that it presents upper and lower support surfaces. These support surfaces are provided with openings to permit the liquid being filtered to be drawn into the vacuum chamber by suction. The liquid so drawn can be piped or conveyed to any desired location. In one embodiment of my invention, a filter media is provided in the form of an endless belt. This belt has the desired filtering characteristics or openings, and is supported on a strong, porous endless belt. The filter media is arranged to pass around the vacuum chamber and over the upper and lower surfaces. In accordance with my invention, the edges of the support belt are provided with magnetic material, and the upper and lower surfaces are provided with magnetic fields which attract the support belt edges and prevent liquid from leaking or passing between the filter media and the upper and lower surfaces even when the filter media is moved. A suction pump is connected to the vacuum chamber to draw liquid through the portion of the filter media positioned over the upper and lower surfaces of the vacuum chamber. The liquid is filtered as it passes through the filter element, and the retained or removed dirt and impurities are lodged in and on the filter media. As the amount of dirt and impurities in the filter media increases, the vacuum in the chamber increases, and the pressure drop or difference across the filter media (that is between the outside of the filter media and the inside of the vacuum chamber) also increases. When this pressure difference reaches a predetermined magnitude, a switch is operated to reduce the vacuum to a lower value and energize a drive mechanism that moves the filter media belt so as to provide new filtering areas for the upper and lower support surfaces. The drive mechanism continues to move the filter media belt for a predetermined time, after which the belt is stopped. The vacuum is then increased, and normal filtering is resumed. The filter media belt, particularly the portion thereof which has become loaded with dirt and impurities, can be cleaned as it is moved by the drive mechanism. This cleaning can be achieved with jets of steam, liquid, or air, with a brush, and with a vacuum. Also, expendable filter materials such as paper can be used as the filter media in place of the filter media belt on the outside of the support belt. This expendable filter material is usually light enough so that it is drawn against the filter support belt by the pressure difference across the filter media. The expendable filter material is moved with the belt as previously described. But the expendable and dirty filter material may be removed and discarded, and new filter material may be fed with the filter support belt as the belt moves toward the vacuum chamber for filtering. Thus, cleaning of the filter media belt may be eliminated or reduced by the expendable filter material. The clean filter media belt or the expendable filter material, preferably with the support belt, positioned and sealed against the upper and lower surfaces of the vacuum chamber, provides an improved filter that can rapidly and efficiently filter a large volume of liquid without the filter having to be shut down or removed from service for cleaning.

The subject matter which I regard as my invention is particularly pointed out and distinctly claimed in the claims. The structure and operation of my invention, together with further objects and advantages, may be better understood from the following description given in connection with the accompanying drawing, in which:

Figure 1:
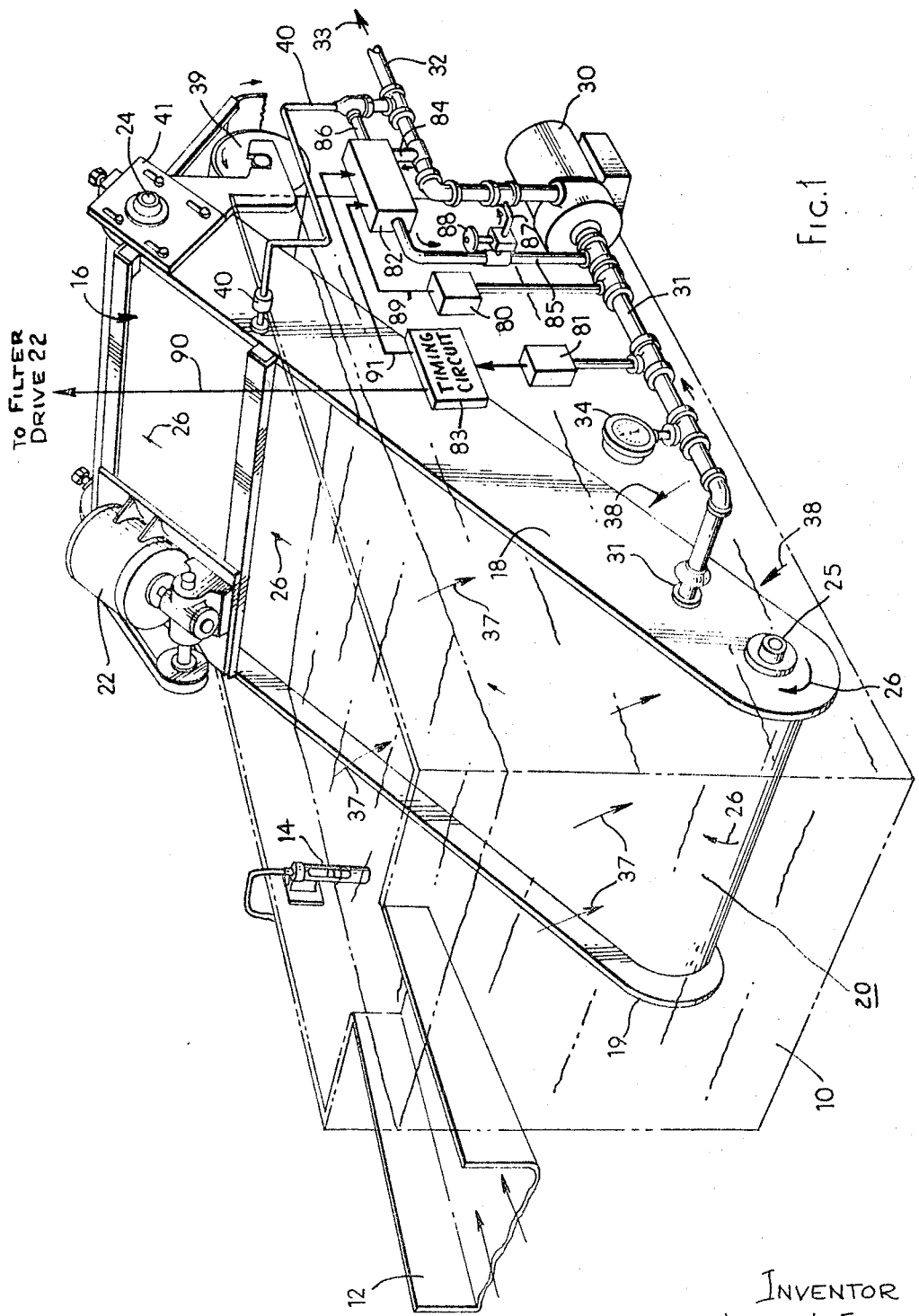
FIGURE 1 shows a perspective view of an improved liquid filter in accordance with my invention.

A filter in accordance with my invention is shown in perspective view in FIGURE 1 with a suitable tank 10 having sides and a bottom. The tank 10 may also comprise a top (not shown) for enclosing the filter so as to exclude foreign matter and to protect personnel. The tank 10 is shown in phantom so as to permit the construction of the filter to be seen. The liquid to be filtered is supplied to the tank 10 through a suitable inlet or trough 12 at one side or end of the tank 10. The level of liquid in the tank 10 may be maintained at a desired level by a liquid level switch 14 which can sense the level of liquid in the tank 10. The switch can control a valve that permits liquid to be admitted by the trough 12 if the level is too low, and that stops the flow of liquid to the tank 10 when the level reaches a predetermined height. A filter 16 constructed in accordance with my invention is placed in the tank 10. This filter 16 comprises a conveyor-like structure made of suitable (especially with respect to the liquid being filtered) material such as steel and having sides 18, 19 between which a filter media or element 20 passes or moves. The filter 16 is positioned in the tank 10 at an angle so that one end of the filter 16 is positioned at or near the bottom of the tank 10 at one end of the tank 10, and so that the other end of the filter 16 is positioned above the liquid level at the other end of the tank 10. The exact angle of orientation of the filter 16 is not critical, but it has been found that an angle between 20 and 45 degrees provides good filtering. The filter element 20 is moved by a suitable filter element drive 22 which may comprise an electric motor with suitable belts or gears connected to a drive roller 24 positioned between the sides 18, 19 at the upper end of the filter 16. The filter element 20 passes around the drive roller 24 and also around an idler roller 25 at the lower end. The filter element 20 preferably moves downward along the lower side of the filter 16 and upward along the upper side of the filter 16 as indicated by the arrows 26. A vacuum chamber 28, having a configuration explained hereinafter, is provided in the filter 16. This vacuum chamber 28 is positioned between the sides 18, 19 and between the idler roller 25 and a location spaced upwardly therefrom. The vacuum chamber 28 is provided with upper and lower openings located in its upper and lower surfaces over which the filter element 20 passes. These openings are preferably always below the upper surface of the liquid in the tank 10. A vacuum pump 30 is connected to the vacuum chamber 28 by a suitable exhaust pipe or connection 31. This pump 30 draws, sucks, or pumps the air or material out of the vacuum chamber 28 and directs the air or material to an outlet pipe 32. After the filter 16 has been in operation for some time, all air is usually removed, and only the liquid is drawn from the vacuum chamber 28. This liquid is drawn through the filter element 20 and the vacuum chamber openings, and is thus filtered. The filtered liquid is directed through the outlet pipe 32 in the direction of the arrow 33 to a storage tank or utilization device (not shown) The vacuum pressure in the vacuum chamber 28 may be indicated by a meter 34 and is sensed by a high vacuum switch 80 and a low vacuum switch 81 for a purpose which will be explained.

When the filter of FIGURE 1 is in operation, liquid which is in the tank 10 and above the filter 16 is drawn by the pump 30 downward as indicated by the arrows 37, and liquid which is in the tank and beneath the filter 16 is drawn by the pump 30 upward as indicated by the arrows 38. This liquid is drawn through the filter media or element 20 which removes the dirt or foreign matter from the liquid and permits the filtered liquid to pass into the vacuum chamber 28 through the pipe 31, and out of the outlet pipe 32. The vacuum in the chamber 28 and the pipe 31 is sensed by a high vacuum switch 80 and a low vacuum switch 81. The electrical output of the high vacuum switch 80 is connected by leads 89 to control a three-way valve 82, and the electrical output of the low vacuum switch 81 is connected to a timing circuit 83. The output of the timing circuit 83 is connected by leads 90 to the filter drive 22 and by leads 91 to control the three-way valve 82. The three-way valve 82 has an inlet port 84 and two outlet ports 85, 86. The inlet port 84 is connected to the outlet pipe 32, the outlet port 85 is connected to the pipe 31, and the outlet port 86 is connected to the outlet pipe 32. The three-way valve 82 takes one of two positions with the inlet port 84 connected to the outlet port 85, or with the inlet port 84 connected to the outlet port 86. A small vacuum maintaining line 87 is connected between the outlet port 85 and the outlet pipe 32. This vacuum line 87 is controlled by a manually or automatically operated valve 88.

As used herein, a high vacuum indicates pressure that is very low with respect to atmospheric pressure or a standard pressure, and a low vacuum indicates a pressure which is only slightly low with respect to atmospheric or standard pressure.

With the pump 30 operating, if the vacuum in the vacuum chamber 28 becomes sufficiently high (indicating that the filter element 20 is dirty or clogged), the high vacuum switch 80 energizes the lead 89 to operate the three-way valve 82 so that the inlet port 84 is connected to the outlet port 85. Thus, the sucking or pumping effect of the vacuum pump 30 is largely offset by the inlet port 84 being connected to the outlet port 85. This reduces the vacuum in the vacuum chamber 28 to some low value determined by the setting of the valve 88. When the vacuum in the chamber 28 becomes sufficiently low, the low vacuum switch 81 operates. This switch 81 sets a timing circuit 83 into operation. The timing circuit 83 energizes the lead 90 for a predetermined length of time, so that the filter element drive 22 is operated and causes the filter element 20 to be advanced around the vacuum chamber 28 and provide a new or clean filter element 20 over the vacuum chamber openings. After this predetermined time has elapsed, the lead 90 is de-energized, and the filter element drive 22 is stopped. At the time the lead 90 is de-energized, the lead 91 is energized to operate the three-way valve 82 so that the inlet port 84 is connected to the outlet port 86. This operation of the three-way valve 82 makes the vacuum pump 30 effective again so that the vacuum chamber 28 has a high vacuum. Thus, filtering at the normally high rate is continued again. It will be seen that during indexing or moving of the filter element 20, the vacuum in the vacuum chamber 28 is reduced so that the filter element 20 may be easily moved. However, sufficient vacuum is maintained so that the filtered or removed dirt or foreign matter does not fall off of the filter element 20. Once a new filter element is moved into position, the vacuum is increased so that the high rate of filtering may take place. By way of example only, a high vacuum indicating a dirty or clogged filter element would be 25 inches of mercury. If the filter element were moved with this vacuum, it would be ruined. So, the vacuum is reduced to say two inches of mercury which keeps the dirt and foreign matter in place but permits the filter element to be moved.

The filter element or media 20 may include a permanent type of endless belt which can be cleaned, or may include an expendable type of material which may be discarded. Both types are preferably supported or carried by an endless support belt. FIGURE 1 shows a filter in which an expendable filter media 39 is provided on a roll. The expendable filter media 39 is used with a permanent filter media which is in the form of an endless belt on the rollers 24, 25. As also shown in FIGURE 1, a liquid supply pipe or connection 40 is connected from the outlet pipe 32 back to the filter 16. This supply pipe 40 provides a small pool of liquid at a location such that the filter element 20 passes over this liquid as the filter element 20 approaches the drive roller 24. It has been found that this added liquid provides a better seal and prevents air from entering or passing around the filter element 20 and being trapped inside the filter element 20. Such air would reach the vacuum chamber 28 and reduce the quality of the filtering. As also shown in FIGURE 1, the drive roller 24 is adjustable by a plate 41 so that the tension on the filter element 20 may be adjusted.

Figure 2:
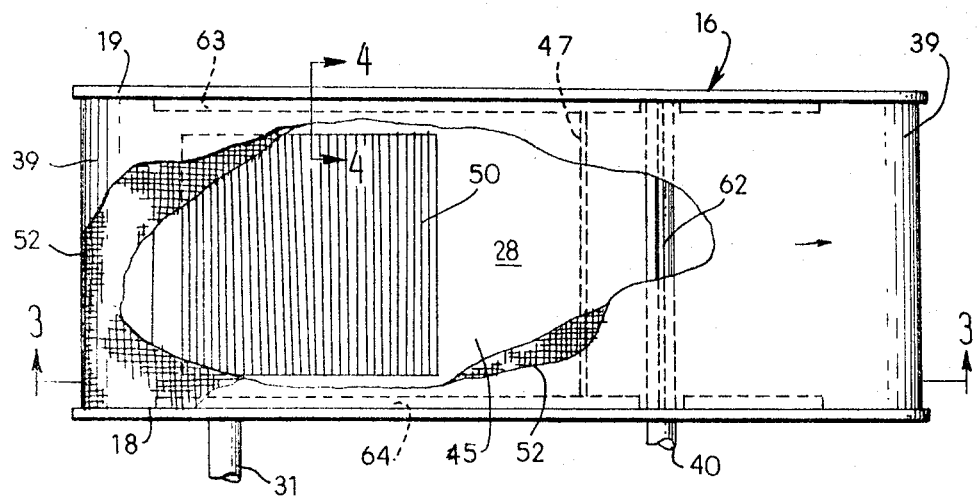
FIGURE 2 shows a plan view, with portions broken away, of the liquid filter in accordance with my invention.
Figure 3:
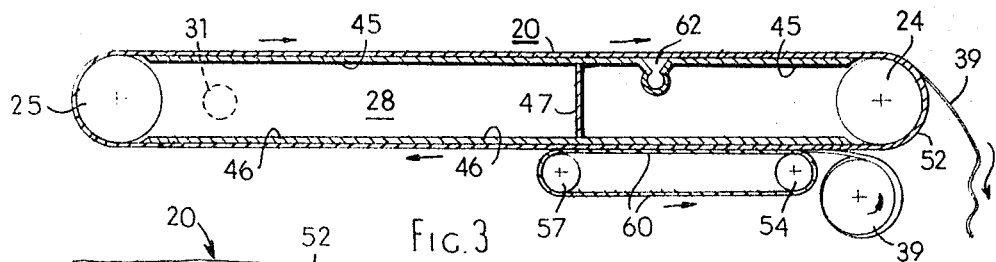
FIGURE 3 shows a cross sectional view of the filter taken along the line 3—3 of FIGURE 2.

FIGURE 2 shows a plan view of the filter 16 of FIGURE 1, and FIGURE 3 show a cross sectional view taken along the line 3—3 of FIGURE 2. FIGURES 2 and 3 show further details of the vacuum chamber 28. As shown, this vacuum chamber 28 is formed by the sides 18, 19 upper and lower plates 45, 46, between the sides, the idler roller 25, and a plate 47. The vacuum chamber 28 is, with the exception of the idler roller 25, generally rectangular in shape, but this is not essential. Thus, the vacuum chamber 28 is formed between the upper and lower plates 45, 46, between the sides 18, 19, the plate 47 at the upper end, and the idler roller 25 at the lower end. The vacuum chamber 28 is provided with suitable vacuum chamber openings 50 in the upper and lower plates 45, 46. FIGURE 2 shows the boundary or outline of these openings 50 in the upper plate 45. It is preferred that the openings in the lower plate 46 have the same boundary and relative position. The filter element 20 of FIGURE 1 may comprise a filter support 52 in the form of an endless belt which is dimensioned to fit around the drive roller 24 and the idler roller 25 and closely between the sides 18, 19. The support belt 52 is preferably relatively porous with respect to the filter media, and is made of material of sufficient size and strength to support the filter media against the vacuum and pulling loads. If a permanent filter media is used with the support belt 52, this permanent filter media may be cleaned as will be explained. In some installations, it may be desirable to use the expendable filter media 39 with the support belt 52. FIGURE 3 shows how the expendable filter media 39 is positioned on the outside of the support belt 52. The expendable filter media 39 is fed from a roll preferably positioned near the drive roller 24, and fed between a pinch roller 54 and the support belt 52. This serves to first position the expendable filter media 39. It is desirable, and in some cases essential, that the expendable filter media 39 be closely positioned against the support belt 52 at all points at which filtering takes place. Because of the suction provided by the pump 30, the vacuum in the vacuum chamber 28 normally provides enough suction to pull the expendable filter media 39 against the support belt 52 and to pull the support belt 52 against the vacuum chamber openings 50 in the vicinity of the vacuum chamber openings 50. However, to insure that the media 39 and the belt 52 fit closely or snugly against the lower vacuum chamber openings, a pulley 57 is provided beneath the vacuum chamber 28 in the vicinity of the vacuum chamber openings 50. This pulley 57 and the roller 54 carry a plurality of belts 60 spaced along the pulley 57 and roller 54 for the purpose of providing upward support to the filters 39, 52. The belts 60 may have any desired cross section, but are preferably circular and made from a spiral or coil of spring-like material. It has been found that such a construction provides better support to the filter media 39 and the belt 52. In operation, the expendable filter media 39 and the support belt 52 pass together from right to left along the bottom plate 46 and its lower vacuum chamber openings 50. The filter media 39 and the belt 52 then pass around the idler roller 25, and then pass from left to right along the top plate 45 and its vacuum chamber openings 50. At the drive roller 24, the expendable filter media 39 is removed and may be discarded. However, the support belt 52 remains on the drive roller 24 and picks up a new section of expendable filter media 39 when the drive roller 24 is operated.

FIGURES 2 and 3 also show the construction of the liquid seal 62 mentioned in connection with FIGURE 1. It will be seen that the filter element 20 with the filter media 39 and belt 52 pass over this liquid seal 62 and pick up some liquid provided by the liquid supply pipe 40. This added liquid serves to seal the filters 39, 52 against the upper and lower plates 45, 46 by adhesion or cohesion, and thus prevent air from getting beneath them and being trapped. Such air might pass around the filter and be introduced into the vacuum chamber 28. Such air would impair the filtering qualities of the filter 16.

Figure 4:
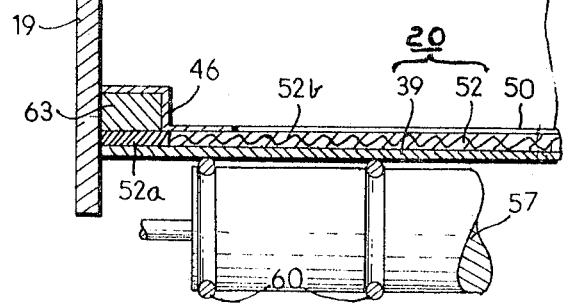
FIGURE 4 shows an enlarged cross sectional view of a portion of the filter taken along the line 4—4 of FIGURE 2.

Previously, one of the problems of any type of moving filter, such as described in connection with FIGURES 1, 2, and 3, has been the tendency of the liquid being filtered to pass around the edges of the filter element 20 at or near the sides 18, 19. In accordance with my invention, I provide an improved construction which almost completely seals the edges of the filter element 20, particularly along the vacuum chamber openings 50. This is achieved by the use of a strip of magnets (or a single magnet) 63 positioned along the side 19, and a strip 64 of magnets (or a single magnet) positioned along the side 18. Details of this construction are shown in the cross sectional view of FIGURE 4, this view being taken along the lines 4—4 of FIGURE 2. As shown in FIGURE 4, the upper plate 45 is bent or shaped to receive the magnet strip 63 along the side 19, and the lower plate 46 is likewise bent or shaped to receive a corresponding magnet or magnet strip 63. A similar construction is used for the side 18 and its magnet strip 64. The support belt 52 is provided with two outer strips or sections of magnetic material 52a (preferably flexible or in small pieces) which have a location and dimension such that they are drawn toward or attracted by the magnet strips 63. Only one strip of magnetic material 52a is shown in FIGURE 4, but a corresponding strip of magnetic material is provided in the belt 52 for the magnet strip 64 at the other side 18. Each of these strips of magnetic material 52a extend inwardly from the outer edges of the belt 52 a sufficient distance to provide an attraction between the belt 52 and the magnets 63 shown in FIGURE 4, and the magnets 63, 64 shown in FIGURE 2. The remainder of the belt 52, that is the portion between the outer strips of magnetic material 52a is constructed of suitable support material 52b. As shown in FIGURE 4, the dimensions are preferably such that the magnetic material 52a is at least as wide, and preferably wider, than the width of the magnet strips 63, and the support material 52b is also preferably wider than the width of the vacuum chamber openings 50. Thus, the magnetic material 52a overlaps the magnets 63, and the support material 52b overlaps the vacuum chamber openings 50. The magnetic material 52a and hence the belt 52 are strongly attracted by the magnets 63 which provide a permanent magnetic field that is unaffected by temperature changes, chemicals, or wear. This magnetic field and the vacuum provide a tight seal which substantially prevents any liquid from passing around the edge or edges of the support belt 52 and the filter media 39. Thus, only filtered liquid can reach the vacuum chamber openings 50. The belt 52 can be constructed of suitable material to support the filter media 39. The magnetic material 52a should be flexible and integral with or tightly joined to the support material 52b along the edges so that no liquid can pass between the materials 52a, 52b. FIGURE 4 also shows the structure and position of the pulley 57 and the belts 60 which are positioned beneath the lower plate 46 to hold the filter element 20 against the lower surface of the plate 46 and the openings 50.

Figure 5:
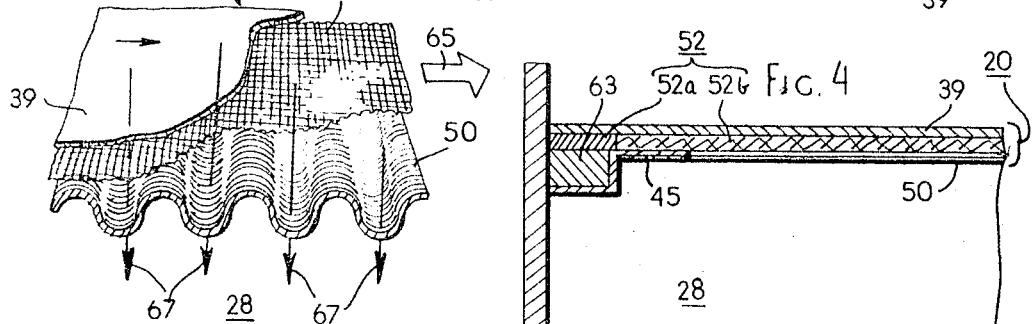
FIGURE 5 shows an enlarged perspective view of portions of the filter element of FIGURE 2.

FIGURE 5 shows an enlarged perspective view of the construction of the vacuum chamber openings 50. These openings 50 may be provided in the upper and lower plates 45, 46 in any suitable manner, but a preferred embodiment uses an expanded metal construction. This construction comprises the steps of punching slots into a section or plate of metal, then expanding the metal along its larger dimensions to open these slots, and then putting a wave or ripple into the metal to give it the sinusoidal configuration shown in FIGURE 5. This construction prevents metal from being wasted as it would be if the plates were punched, and also provides a surface which, it has been found, improves the operation of the vacuum chamber 28. The wave configuration of the expanded metal permits the vacuum effect to be distributed over the entire area in which the openings 50 are provided. A perfectly flat surface with punched openings tends to cause the vacuum to be localized in small areas, and does not permit the vacuum to be evenly distributed over the entire surface as does the construction shown in FIGURE 5. However, it is to be understood that any suitable construction may be provided in accordance with my invention. FIGURE 5 also shows the filter element 20 with its support belt 52 and expendable filter media 39 in their relative positions on the openings 50. It is preferred, but not essential, that the filters move along the wave in the metal in the direction of the arrow 65 so as to reduce the possibilities of the filters catching or snagging on the corners and edges of the expanded metal.

Figure 6:
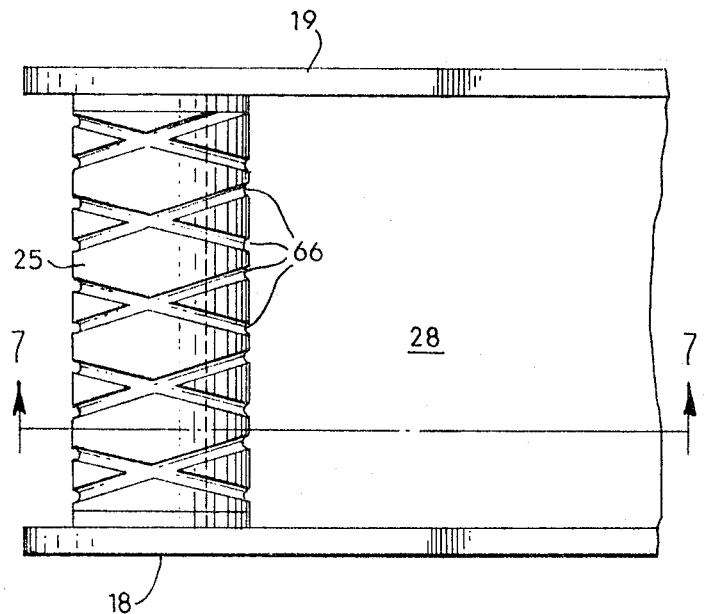
FIGURE 6 shows a plan view of a preferred embodiment of the lower roller used in the filter of FIGURE 2.
Figure 7:
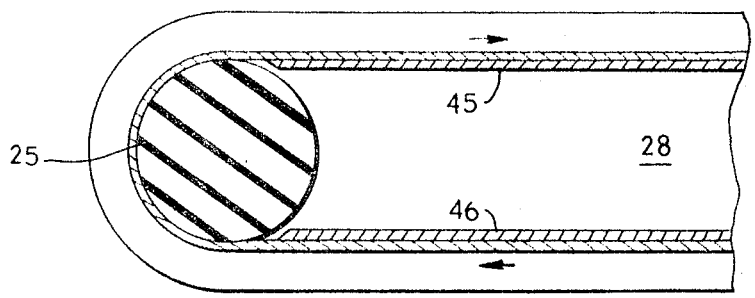
FIGURE 7 shows a cross sectional view taken along the line 7—7 of FIGURE 6.

As mentioned in connection with FIGURE 1, the filter element 20 moves downward from the drive roller 24 along the lower plate 46, around the idler roller 25 and then upward toward the drive roller 24 along the upper plate 45. In order that the dirt and other foreign matter collected by the filter element 20 be retained and not dropped or lost in the liquid being filtered as the filter element 20 passes around the idler roller 25, I preferably construct the idler roller 25 as shown in FIGURES 6 and 7. As shown in the plan view of FIGURE 6 (with the plates 45, 46 removed), the idler roller 25 is provided with a plurality of notches or grooves 66 which are located in the surface of the idler roller 25 around its circumference. These notches or grooves 66 permit the vacuum effect of the vacuum chamber 28 to appear along the outer peripheries of the idler roller 25. Thus, filtering is provided at the outer surface of the idler roller 25, and the dirt and collected material remain on the filter element despite motion of the element around the idler roller 25. In addition, I prefer that the upper and lower plates 45, 46 extend as closely as possible to the circumference of the idler roller 25 as shown in FIGURE 7. In this connection it may be desirable that the vacuum chamber openings 50 in the lower plate 46 extend substantially up to the idler roller 25 so that the vacuum effect is present at all points along the lower plate 46 adjacent the idler roller 25. Thus, the vacuum effect is complete along the filtering portion of the lower plate 46, particularly below and around the idler roller 25. When the filter element is above the upper plate 45, gravity tends to hold the dirt and collected material until the filter element reaches the vacuum chamber openings 50 in the upper plate 45. The exact configuration of the grooves or notches 66 is not critical, as long as a sufficient number of these grooves 66 is provided so that the vacuum effect in the vacuum chamber 28 can reach a substantial portion of the periphery of the idler roller 25. For example, the grooves may take the form shown for the drive roller 24 in FIGURE 8.

The filter as thus far described has contemplated the use of a filter element 20 comprising an expendable filter media 39 positioned on the outside of the support belt 52. In operation, the vacuum chamber 28 draws the liquid to be filtered through the expendable filter media 39 which filters the liquid, and then through the vacuum chamber openings 50 into the vacuum chamber 28 as shown by the arrows 37, 38 of FIGURE 1. The filtered liquid is pumped through the pipe 31 to the outlet pipe 32 where it can be reclaimed and re-used. A portion of this filtered liquid is applied through the pipe 40 to the liquid seal 62 to wet the filter element with the liquid and seal the element so that air is excluded. This exclusion of air improves the operation of the filter by eliminating the possibility of air being drawn into the vacuum area by passing along the inner surface of the support belt 52 into the vacuum chamber 28, thereby reducing the vacuum.

As mentioned, the filter element is normally stationary. As more dirt and material accumulate on the filter element, the vacuum in the vacuum chamber 28 increases (i.e., the pressure decreases). When the vacuum in the chamber 28 reaches a magnitude determined by the setting of the high vacuum switch 80, the vacuum is reduced, and the filter element drive 22 becomes energized. This causes the drive roller 24 to rotate and as it does so, it carries the filter element 20 including the support belt 52 and the expendable filter media 39, along with it. This causes the filter element in the vicinity of the lower vacuum chamber openings 50 to rotate around the idler roller 25 and across the upper vacuum chamber openings 50 under a vacuum to prevent accumulated dirt and foreign material from falling off in the vicinity of the idler roller 25. The filter element in the vicinity of the upper vacuum chamber openings 50 moves upward and to the right, as viewed in FIGURES 1 and 3. The new expendable filter media 39 is drawn along the support belt 52 by the pinch roller 54 and the friction between the expendable filter media 39 and the belt 52. This friction and the suction at the openings 50 hold the expendable filter media 39 closely against the support belt 52. After some amount of rotation or movement sufficient to provide a new or clean filter media, the rotation or movement is stopped, and the vacuum increased to a normal level or magnitude. The used expendable filter media 39 may be discarded.

Figure 8:
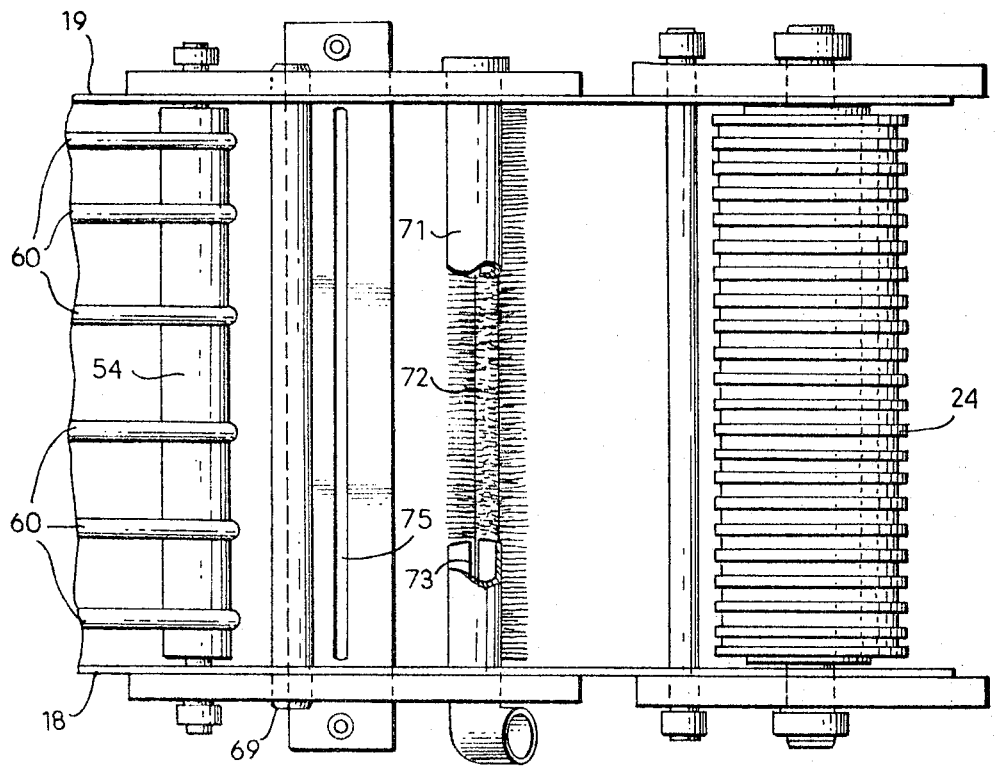
FIGURE 8 shows a plan view of the drive roller and cleaning apparatus which may be used with a filter in accordance with my invention.
Figure 9:
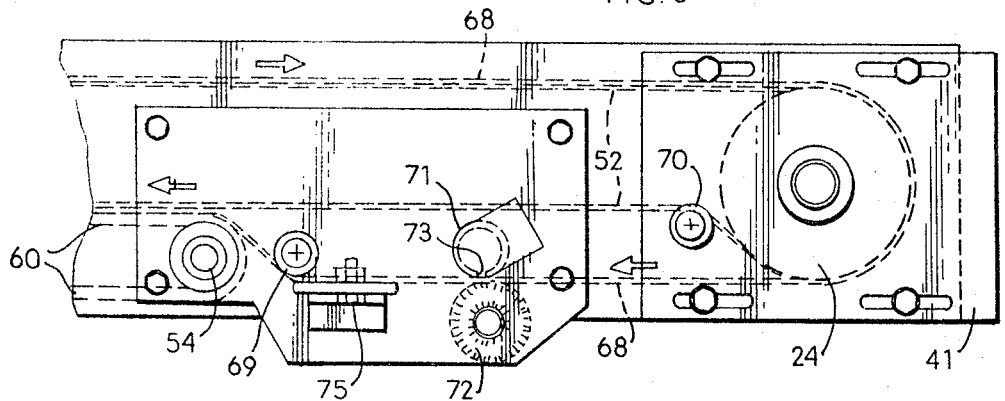
FIGURE 9 shows a side elevation view of the drive roller and cleaning apparatus of FIGURE 8.

In some applications, the expendable filter media 39 may not be desirable or necessary, and a permanent filter media may be desirable or needed. FIGURES 8 and 9 show a permanent filter media 68 which is used with the support belt 52. This permanent filter media 68 is formed as an endless belt of filter material having the requisite porosity (which may vary from outside to inside), dimensions, and strength. Since the permanent filter media 68 is re-used as it is moved around the rollers 24, 25 with the support belt 52, the media 68 should be or may have to be cleaned. FIGURES 8 and 9 show views of a cleaning arrangement, in accordance with my invention, which can be used with the filter 16 of FIGURE 1. FIGURES 8 and 9 show the upper portion of the filter 16. The permanent filter media 68 moves between the sides 18, 19 as described for the expendable media, but also moves around the drive roller 24 as indicated by the arrows. At the bottom of the drive roller 24, the media 68 and belt 52 are separated by an idler roller 69 and an idler roller 70. These rollers 69, 70 cause the permanent filter media 68 to pass between a steam knife 71 and a rotating brush 72 of wire, plastic, or suitable material, both of which extend the width of the filter media 68. The steam knife 71 is inside the media 68 and comprises a pipe having a slit or opening 73 at its bottom edge. This opening 73 permits steam to strike against the inside of the permanent filter media 68 so as to remove or steam out the dirt and filtered material. Removal of this dirt is assisted by the rotating brush 72 which is positioned on the outside of the permanent filter media 68 opposite the slot or opening 73 in the steam knife 71. As the permanent filter media 68 continues to move, it passes over a slot 75 which is connected to a vacuum pump (not shown). This slot 75 sucks up all of the steamed and brushed dirt and foreign material so that after the permanent filter media 68 passes by the slot 75, it is sufficiently clean for further filtering. In some cases where the permanent filter media 68 may become excessively dirty, an additional air knife may be provided adjacent the steam knife 71. This air knife is preferably positioned on the inside of the permanent filter media 68 and either ahead of or behind the steam knife 71, but preferably behind the steam knife 71, so as to blow out the dirt and foreign material dislodged or loosened by the steam knife 71. After passing the slot 75, the filter media 68 is directed against the support belt 52 by the pinch roller 54, and the two are supported against the bottom 46 by the belts 60, as previously described. FIGURE 8 also shows the drive roller 24 with a different configuration of slots or grooves, this configuration also being usable for the idler roller 25 to permit the vacuum effect to be presented around the periphery of the idler roller 25. Other cleaning devices may also be used.

In addition to the filtering provided by the vacuum chamber as described, the movable filter element or media may also skim off certain materials, such as oil floating on the top of the liquid, from the liquid to be filtered. This could be achieved with either an expendable or a permanent filter element or media to which the material floating on top normally clings as the filter media leaves the top of the surface of the liquid. Thus, cleaning by a skimming process as well as filtering by the vacuum chamber may be achieved in accordance with my invention.

It will thus be seen that my invention provides an improved liquid filter and process having a movable filter element which can be moved in order to present a new or clean filter media. A vacuum chamber draws the liquid to be filtered through the filter media, after which the filtered liquid can be re-used. Persons skilled in the art will appreciate that modifications may be made in accordance with my invention. For example, the vacuum chamber dimensions may be modified or changed, and the size of the vacuum chamber openings may be modified. However, it is preferred that the vacuum chamber openings be below the top surface of the liquid being filtered. In some cases, it may be desirable to have vacuum chamber openings either at the top or at the bottom of the vacuum chamber, but both openings, as shown in the figures, are preferred. Depending upon the application, the filter media may take numerous forms, such as active or inactive, constant or varying porosity, special coatings, and permanent or expendable. Also, the filter media may be strong enough to support itself, in which case it would hold the magnetic material. The idler roller may be provided with magnets around its periphery in conformance with the magnets 63, 64 as shown in FIGURE 2 so as to provide further holding or attraction of the edges of the filter element against the idler roller 25. Also, in some applications, it may not be necessary to provide the support in the forms of the rollers 54, 57 and the belts 60, although such support is desirable. The indexing or moving of the belt and filter media can also be achieved by means other than the vacuum switches, although such switches with the timing circuit have provided good operation. And finally, cleaning of the support belt may be desirable or necessary. Therefore, while my invention has been described with reference to particular embodiments, it is to be understood that modifications may be made without departing from the spirit of my invention or from the scope of the claims.

What I claim as new and desire to secure by Letters Patent of the United States is:

1. An improved filter for liquids comprising:
 (a) a tank for receiving said liquids to be filtered;
 (b) a vacuum chamber positioned in said tank and having at least one surface with a plurality of openings therein and having means connected thereto for removing liquid;
 (c) and a filter element arranged for movement over said one surface, said filter element covering said openings and having its edges magnetically attracted to said one surface for reducing leakage of said liquid between said filter element edges and said one surface.

2. The filter of claim 1 wherein said magnetic attraction is provided by a plurality of magnets positioned on said one surface along the paths followed by said edges of said filter element and by magnetic material positioned on said edges of said filter element.

3. The filter of claim 2 and further comprising drive means connected to said filter element for moving said filter element, pressure sensing means for sensing the pressure in said vacuum chamber, and means connecting said pressure sensing means to said drive means for operating said drive means in response to said pressure.

4. The filter of claim 3 and further comprising means connected to said pressure sensing means to increase the pressure in said vacuum chamber before said drive means are operated.

5. An improved filter for liquids comprising:
 (a) a receiving tank for said liquid;
 (b) a vacuum chamber positioned in said receiving tank, said vacuum chamber having upper and lower surfaces with a plurality of openings therein;
 (c) means connected to said vacuum chamber for drawing liquid therefrom;
 (d) a filter element belt positioned over said upper and lower surfaces and arranged for movement over said upper and lower surfaces, said belt covering said plurality of openings in said upper and lower surfaces and having its edges magnetically held against said upper and lower surfaces respectively; and
 (e) means connected to said filter element belt for moving said belt over said surfaces to provide different portions on said surfaces for filtering said liquid.

6. The filter of claim 5 and further comprising means positioned adjacent said filter element belt for cleaning a portion of said belt as it moves over said upper and lower surfaces.

7. The filter of claim 5 wherein said filter element belt forms a closed loop, and wherein said vacuum chamber comprises first and second rollers mounted on said chamber for movably supporting said filter element belt so that said belt may move over said upper and lower surfaces.

8. The filter of claim 7 and further comprising drive means connected to one of said rollers for moving said filter element belt, pressure sensing means for sensing the pressure in said vacuum chamber, and means connecting said pressure sensing means to said drive means for selectively rendering said drive means operative in response to a predetermined sensed pressure.

9. The filter of claim 8 and further comprising control means for said liquid drawing means, and means connecting said control means to said pressure sensing means for increasing the pressure in said chamber in response to a predetermined sensed low pressure before said drive means are rendered operative and for decreasing, the pressure in said chamber after said drive means are rendered inoperative.

10. A filter for liquids comprising:
(a) a sump having at least a bottom and sides for receiving said liquids;
(b) a vacuum chamber having two sides, a top, a bottom, a first end, and a roller forming a second end, said top and bottom having openings therein for freely passing said liquids;
(c) means mounting said chamber in said sump with said vacuum chamber bottom adjacent said sump bottom;
(d) a filter comprising a movable endless belt mounted on said vacuum chamber so that said belt is positioned over said chamber top, beneath said chamber bottom around a portion of said roller, and covers said chamber top and bottom openings;
(e) magnets positioned along at least two spaced and substantially straight lines on said chamber top, said straight lines being substantially parallel to the direction along which said belt moves, said top openings being located between said straight lines on said chamber top;
(f) magnets positioned along at least two spaced and substantially straight lines on said chamber bottom, said straight lines being correspondingly positioned relative to said lines on said chamber top and being substantially parallel to said predetermined direction, said bottom openings being located between said straight lines on said chamber bottom; and
(g) magnetic material positioned along the edges of said belt in substantially parallel straight lines that are spaced to correspond to said spacing of said magnets so that said belt edges are magnetically attracted to said chamber top and bottom and prevent liquids in said sump from passing between and around the edges of said belt into said openings in said chamber top and bottom.

11. The filter of claim 10 and further comprising means connected to said vacuum chamber for drawing liquids therefrom.

12. The filter of claim 11 and further comprising a second roller for supporting said belt, one of said rollers being driven in a predetermined manner.

13. The filter of claim 11 wherein said belt comprises a support portion and a filter media having predetermined characteristics, and further comprising means for selectively moving said belt.

14. The filter of claim 11 wherein said belt is at least partially comprised of a filter media having predetermined characteristics, and further comprising drive means for said belt, means for sensing the vacuum in said vacuum chamber and producing a signal in response to said vacuum reaching below a predetermined magnitude, and means connected between said drive means, said drawing means, and said pressure sensing means for selectively decreasing said vacuum and moving said belt in response to said signal.

15. The filter of claim 11 wherein said roller has depressions around the periphery thereof for drawing said liquids therethrough into said vacuum chamber.

References Cited
UNITED STATES PATENTS

| | | | |
|---|---|---|---|
| 2,867,324 | 1/1959 | Hirs | 210—97 |
| 2,983,383 | 5/1961 | Wallace et al. | 210—401 X |
| 3,091,336 | 5/1963 | Hirs | 210—111 |

SAMIH N. ZAHARNA, Primary Examiner

U.S. Cl. X.R.

210—251, 287, 401